United States Patent
Lewis et al.

(10) Patent No.: US 10,100,645 B2
(45) Date of Patent: Oct. 16, 2018

(54) TRAILING EDGE COOLING CONFIGURATION FOR A GAS TURBINE ENGINE AIRFOIL

(75) Inventors: Scott D. Lewis, Vernon, CT (US); Gary A. Zess, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 1935 days.

(21) Appl. No.: 13/584,172

(22) Filed: Aug. 13, 2012

(65) Prior Publication Data

US 2014/0044555 A1    Feb. 13, 2014

(51) Int. Cl.
*F01D 5/18*    (2006.01)
*F01D 5/28*    (2006.01)

(52) U.S. Cl.
CPC .............. *F01D 5/18* (2013.01); *F01D 5/187* (2013.01); *F01D 5/288* (2013.01); *F05D 2230/90* (2013.01); *F05D 2240/127* (2013.01); *F05D 2240/304* (2013.01); *F05D 2260/2212* (2013.01); *F05D 2260/22141* (2013.01); *Y02T 50/676* (2013.01); *Y10T 29/49341* (2015.01)

(58) Field of Classification Search
CPC ............. F01D 5/18; F01D 5/186; F01D 25/08
See application file for complete search history.

(56) References Cited

U.S. PATENT DOCUMENTS

| | | | |
|---|---|---|---|
| 4,019,831 A | 4/1977 | Franklin et al. | |
| 4,515,523 A * | 5/1985 | North | F01D 5/187 415/115 |
| 5,288,207 A | 2/1994 | Linask | |
| 5,695,320 A | 12/1997 | Kercher | |
| 5,772,397 A | 6/1998 | Morris et al. | |
| 6,190,120 B1 * | 2/2001 | Thatcher et al. | 415/115 |
| 6,234,754 B1 | 5/2001 | Zelesky et al. | |
| 6,254,334 B1 | 7/2001 | LaFleur | |
| 6,382,920 B1 * | 5/2002 | Dopper | C23C 14/00 416/241 B |
| 6,402,470 B1 | 6/2002 | Kvasnak et al. | |
| 6,514,042 B2 | 2/2003 | Kvasnak et al. | |

(Continued)

FOREIGN PATENT DOCUMENTS

EP    0924383 B1    6/1999

OTHER PUBLICATIONS

U.S. Appl. No. 13/424,752, "Trailing Edge Cooling," filed on Mar. 20, 2012.

(Continued)

*Primary Examiner* — Richard Edgar
(74) *Attorney, Agent, or Firm* — Carlson, Gaskey & Olds, P.C.

(57) ABSTRACT

An airfoil for a gas turbine engine includes pressure and suction surfaces provided by pressure and suction walls that extend in a radial direction and are joined at a leading edge and a trailing edge. A cooling passage is arranged between the pressure and suction walls and extends to the trailing edge. Elongated pedestals are arranged in the cooling passage and interconnect the pressure and suction walls. The elongated pedestals are spaced apart from one another in the radial direction and extend from a plane to the trailing edge. A metering pedestal includes at least a portion that is arranged between the plane and the trailing edge. The portion is provided between adjacent elongated pedestals in the radial direction.

3 Claims, 4 Drawing Sheets

(56) References Cited

U.S. PATENT DOCUMENTS

| | | | |
|---|---|---|---|
| 6,808,367 B1 | 10/2004 | Liang | |
| 6,896,487 B2 | 5/2005 | Cunha et al. | |
| 7,175,386 B2 | 2/2007 | Cherolis et al. | |
| 7,377,748 B2 | 5/2008 | Mongillo, Jr. et al. | |
| 7,575,414 B2* | 8/2009 | Lee | F01D 5/186 |
| | | | 415/115 |
| 7,686,580 B2 | 3/2010 | Cunha et al. | |
| 7,713,027 B2 | 5/2010 | Cherolis et al. | |
| 7,731,481 B2* | 6/2010 | Cunha et al. | 416/97 R |
| 7,938,624 B2 | 5/2011 | Tibbott | |
| 8,882,461 B2* | 11/2014 | Morris et al. | 416/97 R |
| 2004/0062636 A1* | 4/2004 | Mazzola et al. | 415/115 |
| 2005/0244264 A1* | 11/2005 | Jacks et al. | 415/115 |
| 2006/0222497 A1 | 10/2006 | Lee | |
| 2006/0239819 A1* | 10/2006 | Albert et al. | 416/97 R |
| 2008/0063524 A1 | 3/2008 | Tibbott | |
| 2008/0095636 A1 | 4/2008 | Cherolis et al. | |
| 2008/0298975 A1* | 12/2008 | James et al. | 416/229 A |
| 2009/0074576 A1 | 3/2009 | Brostmeyer | |
| 2009/0285684 A1 | 11/2009 | Pinero et al. | |
| 2010/0255200 A1* | 10/2010 | Kaya | F01D 5/288 |
| | | | 427/282 |
| 2011/0085915 A1* | 4/2011 | Krueckels et al. | 416/97 R |

OTHER PUBLICATIONS

International Search Report and Written Opinion for International Application No. PCT/US2013/049553 completed on Oct. 11, 2013.
International Preliminary Report on Patentability for International Application No. PCT/US2013/049553 dated Feb. 26, 2015.
EP Extended Search Report for EP Application No. 13830019.9 completed on Jul. 21, 2015.

* cited by examiner

TRAILING EDGE COOLING CONFIGURATION FOR A GAS TURBINE ENGINE AIRFOIL

BACKGROUND

This disclosure relates to a gas turbine engine airfoil. In particular, the disclosure relates to a trailing edge cooling configuration having a particular arrangement of pedestals.

Coolant air exiting a turbine blade creates a mixing loss, which degrades the performance of a gas turbine. The mainstream air receives a loss as it brings the coolant air up to its velocity direction and speed. It is desired to minimize this mixing loss to improve the performance of the engine and lower the specific fuel consumption of the engine. From a turbine blade durability perspective it is desired to have all of the turbine blades in the rotor of one stage to have the same amount of cooling flow. This is because the cooling flow levels are one of the strongest drivers on blade metal temperature and the blade metal temperatures set the life of the part. The life of the turbine is determined by the failure of just one blade as opposed to many blades. The extra flow those blades are using comes at a performance penalty as it creates additional mixing losses. That extra coolant flow also bypasses the combustor and is not combusted, which is an additional loss to the system.

One type of turbine blade includes a trailing edge cooling passage having pedestals. In one example, elongated pedestals at the trailing edge exit are used to meter the flow of fluid from the trailing edge cooling passage into the gas path.

SUMMARY

In one exemplary embodiment, an airfoil for a gas turbine engine includes pressure and suction surfaces provided by pressure and suction walls that extend in a radial direction and are joined at a leading edge and a trailing edge. A cooling passage is arranged between the pressure and suction walls and extends to the trailing edge. Elongated pedestals are arranged in the cooling passage and interconnect the pressure and suction walls. The elongated pedestals are spaced apart from one another in the radial direction and extend from a plane to the trailing edge. A metering pedestal includes at least a portion that is arranged between the plane and the trailing edge. The portion is provided between adjacent elongated pedestals in the radial direction.

In a further embodiment of any of the above, the airfoil includes first, second, third and fourth rows of pedestals spaced from one another in a chord-wise direction. The first, second and third rows respectively include radially spaced first, second and third pedestals, wherein the fourth row includes the elongated pedestals and the metering pedestals.

In a further embodiment of any of the above, at least one the first and second pedestals are larger than the third and metering pedestals.

In a further embodiment of any of the above, the metering pedestal is round.

In a further embodiment of any of the above, the first and metering pedestals are aligned with one another in a chord-wise direction. The second and elongated pedestals are aligned with one another in the chord-wise direction.

In a further embodiment of any of the above, the third pedestal is arranged between the first and second pedestals in the radial direction.

In a further embodiment of any of the above, the metering pedestals and elongated pedestals are tangent to the plane.

In a further embodiment of any of the above, the elongated pedestals are spaced apart from one another between 0.045 inch (1.14 mm) and 0.075 inch (1.91 mm) in the radial direction.

In a further embodiment of any of the above, a trailing edge exit is provided between the elongated pedestals in the radial direction at the trailing edge. The trailing edge exit has an uncoated width of between 0.030 inch (0.76 mm) and 0.060 inch (1.52 mm).

In a further embodiment of any of the above, a trailing edge exit is provided between the elongated pedestals in the radial direction at the trailing edge. The trailing edge exit has an uncoated height of between 0.010 inch (0.25 mm) and 0.016 inch (0.41 mm).

In a further embodiment of any of the above, the pressure and suction surfaces support a thermal barrier coating.

In a further embodiment of any of the above, the airfoil includes a thermal barrier coating in the trailing edge exit downstream from the metering pedestal without reaching the metering pedestal.

In a further embodiment of any of the above, the elongated pedestal is perpendicular to the trailing edge.

In a further embodiment of any of the above, the airfoil is a turbine blade.

In a further embodiment of any of the above, the elongated pedestals taper down towards the trailing edge.

In a further embodiment of any of the above, the elongated pedestals have both a tapered and a non-tapered section.

In a further embodiment of any of the above, the metering pedestals are oblong, but do not extend all of the way to the trailing edge.

In another exemplary embodiment, a method of providing an airfoil includes the steps of forming an airfoil including pressure and suction surfaces provided by pressure and suction walls extending in a radial direction and joined at a leading edge and a trailing edge. A cooling passage is arranged between the pressure and suction walls and extends to the trailing edge. Elongated pedestals are arranged in the cooling passage and interconnect the pressure and suction walls. The elongated pedestals are spaced apart from one another in the radial direction to provide a trailing edge exit. The elongated pedestals extend from a plane to the trailing edge. A metering pedestal includes at least a portion that is arranged between the plane and the trailing edge. The portion is provided between adjacent elongated pedestals in the radial direction. The method includes coating the airfoil with a thermal barrier coating, the thermal barrier coating in the trailing edge exit downstream from the metering pedestal without reaching the metering pedestal.

In a further embodiment of any of the above, the pressure and suction surfaces support a thermal barrier coating.

In a further embodiment of any of the above, the airfoil is a turbine blade.

In a further embodiment of any of the above, the method includes first, second, third and fourth rows of pedestals spaced from one another in a chord-wise direction. The first, second and third rows respectively include radially spaced first, second and third pedestals, wherein the fourth row includes the elongated pedestals and the metering pedestals. The first and metering pedestals are aligned with one another in a chord-wise direction. The second and elongated pedestals are aligned with one another in the chord-wise direction.

In a further embodiment of any of the above, the metering pedestals and elongated pedestals are tangent to the plane.

BRIEF DESCRIPTION OF THE DRAWINGS

The disclosure can be further understood by reference to the following detailed description when considered in connection with the accompanying drawings wherein.

DETAILED DESCRIPTION

Figure 1:
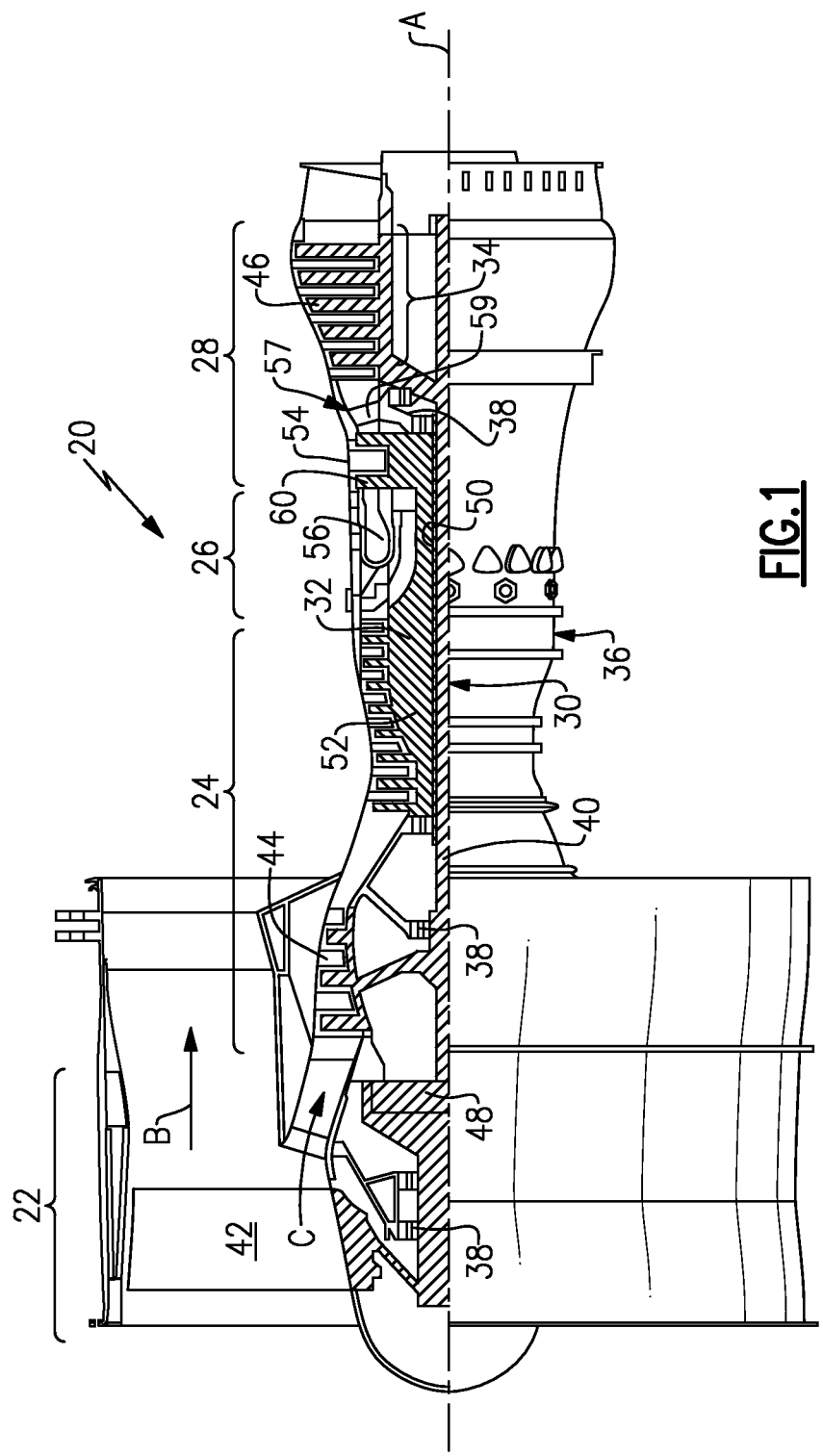
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet (10,668.00 m). The flight condition of 0.8 Mach and 35,000 ft. (10,668.00 m), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$]. The "Low corrected fan tip speed", as disclosed herein according to one non-limiting embodiment, is less than about 1150 ft/second.

Figure 2:
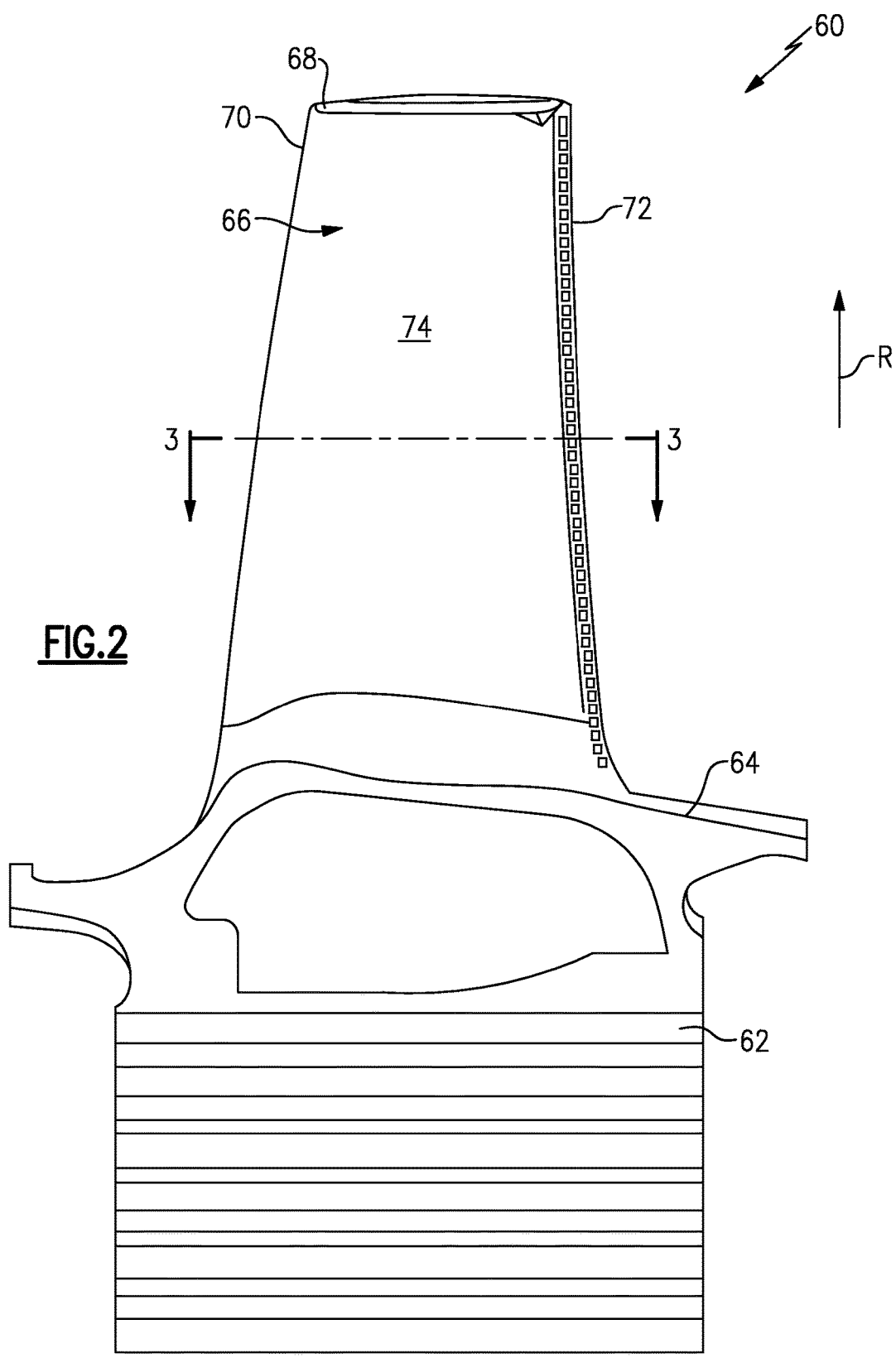
FIG. 2 is a perspective view of an example turbine blade.

Referring to FIG. 2, an example turbine blade 60 is illustrated, which may be suitable for the high pressure turbine 54, for example. In one example, the turbine blade 60 is used in a first stage high pressure turbine 54, although the disclosed trailing edge cooling configuration may be used for any blade or stator vane within a gas turbine engine.

Figure 3:
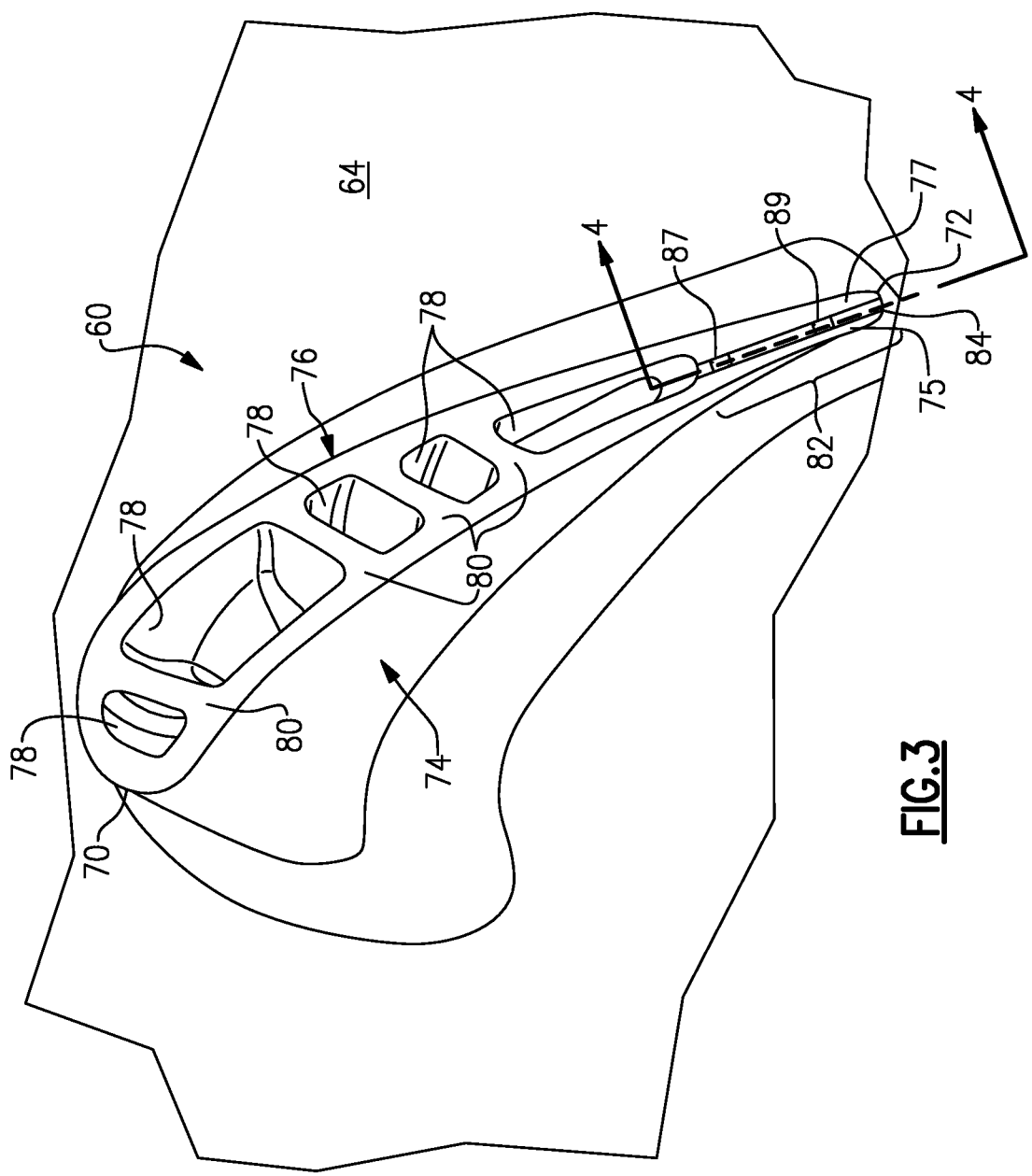
FIG. 3 is a cross-sectional view through the airfoil shown in FIG. 2 taken along line 3-3.

The turbine blade 60 includes an airfoil 66 extending in a radial direction R from a platform 64, which is supported by a root 62, to a tip 68. The airfoil 66 includes pressure and suction surfaces 74, 76 extending in the radial direction R and joined at a leading edge 70 and a trailing edge 72. Referring to FIG. 3, the pressure and suction surfaces 74, 76 are respectively provided by pressure and suction walls 75, 77. Walls 80 are interconnected between the pressure and suction walls 75, 77 in an airfoil thickness direction that is generally perpendicular to a chord-wise direction that extends between the leading and trailing edges 70, 72.

Figure 5:
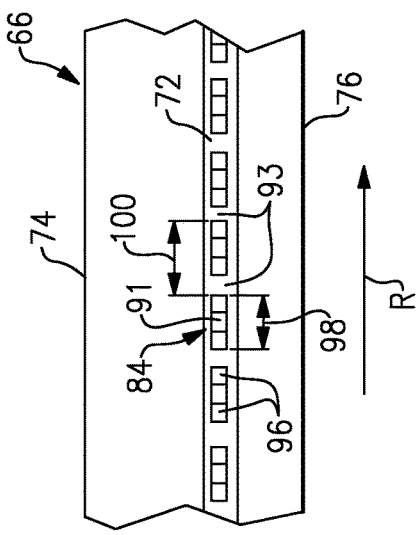
FIG. 5 is a trailing edge view of the airfoil shown in FIG. 3.

Cooling passages 78 extend in a radial direction between the walls 75, 77, 80 of the airfoil 66. A trailing edge cooling passage 82 is fluidly connected to one of the cooling passages 78 and arranged between the pressure and suction walls 75, 77. The trailing edge cooling passage 82 extends to the trailing edge 72. In the example configuration, the trailing edge cooling passage 82 terminates in discrete trailing edge exits 84 at the trailing edge 72, which is best illustrated in FIGS. 4 and 5.

Figure 4:
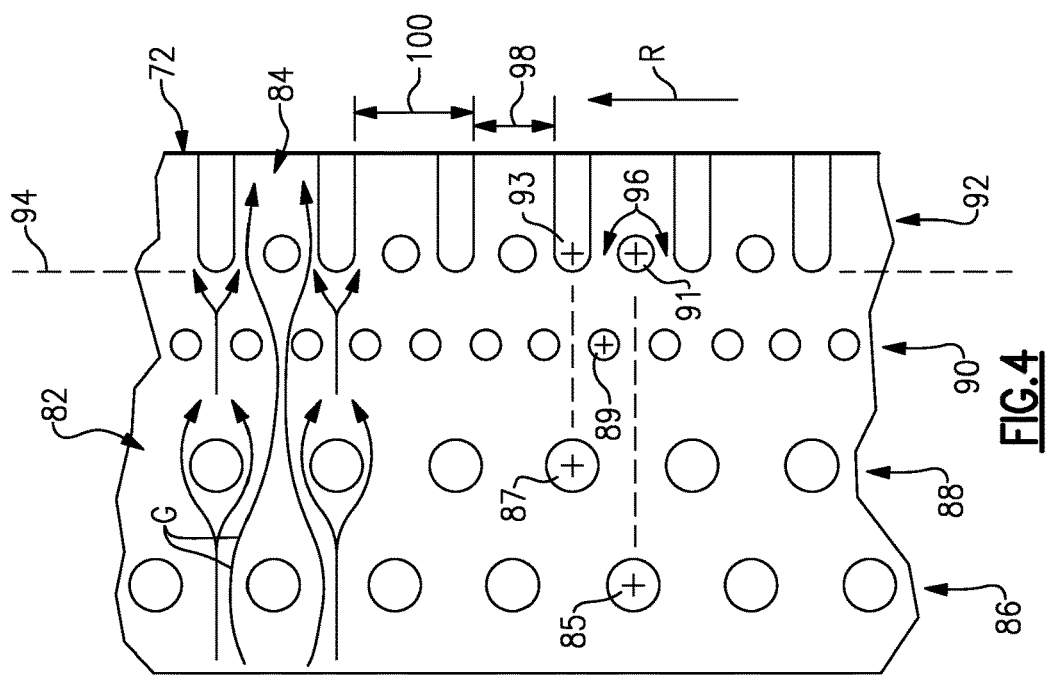
FIG. 4 is a cross-sectional view through a trailing edge cooling passage of the airfoil shown in FIG. 3 taken along 4-4.

Referring to FIG. 4, the pressure and suction walls 75, 77 are joined to one another by multiple spaced apart pedestals. In one example, the trailing edge cooling passage 82 and pedestals are formed by a stamped refractory metal core, or another suitable material, such as ceramic. A first row 86 of first pedestals 85 and second row 88 of second pedestals 87 are spaced apart from one another in the chord-wise direction and are of the same size in the example shown. A third row 90 of third pedestals 89 is arranged between the second row 88 and the trailing edge 72. A fourth row 92 includes metering pedestals 91 and elongated pedestals 93 arranged in an alternating relationship in the radial direction R.

In the example, the third pedestals 89 and the metering pedestals 91 are the same size as one another, but smaller than the pedestals 85, 87. In the example, the pedestals 85, 87, 89, 91 have a round cross-section. The first and metering pedestals 85, 91 are aligned with one another in a chord-wise direction, and the second and elongated pedestals 87, 93 are aligned with one another in the chord-wise direction. In the example, the elongated pedestals 93 are perpendicular to the trailing edge 72. In another example, the elongated pedestals may be aligned with the external streamlines of the gas flow.

Figure 7:
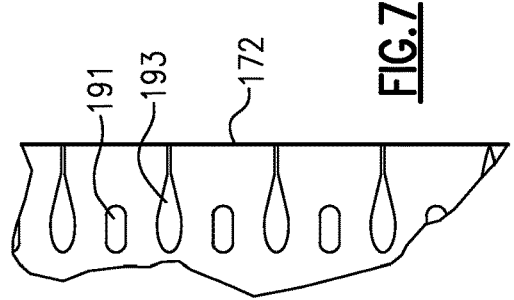
FIG. 7 is another example cross-sectional view through a trailing edge cooling passage of the airfoil shown in FIG. 3.

The pedestals may have any suitable shape based upon the application. For example, the metering pedestal 191 may be elongated, as shown in FIG. 7, but do not extend all of the way to the trailing edge. The elongated pedestals 193 taper down towards the trailing edge 172. The elongated pedestals 193 have both a tapered and a non-tapered section in the example.

Returning to FIG. 4, the elongated pedestals 93 extend from a plane 94 to the trailing edge 72. The metering pedestals 91 include at least a portion arranged between the plane 94 and the trailing edge 72. In the example, the metering pedestals 91 and an end of the elongated pedestals 93 are tangent to the plane 94. The metering pedestals 91 are arranged between adjacent elongated pedestals 93 to provide gaps 96 that regulate the flow of fluid G through the trailing edge exit 84, as shown in FIG. 4.

Referring to FIGS. 4 and 5, the elongated pedestals 93 have an elongated pedestal spacing 100 of 0.045-0.075 inch (1.14-1.91 mm), and, for example, 0.060 inch (1.52 mm). The trailing edge exit 84 has an uncoated width 98 of 0.030-0.060 inch (0.76-1.52 mm), and, for example, 0.043 inch (1.09 mm), and an uncoated height of 0.010-0.016 inch (0.25-0.41 mm), and, for example, 0.012 inch (0.30 mm). In one example, the diameters of the first and second pedestals 85, 87 may be 0.025 inch (0.64 mm), and the diameters of the third and metering pedestals 87, 89 may be 0.017 inch (0.43 mm).

Figure 6:
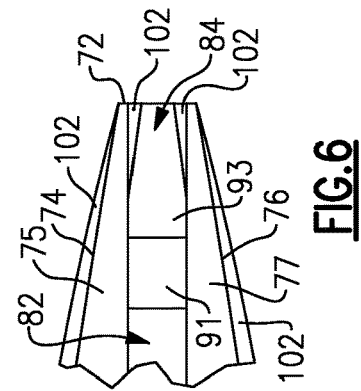
FIG. 6 is an enlarged cross-sectional view through the trailing edge cooling passage shown in FIG. 3.

Referring to FIG. 6, a thermal barrier coating (TBC) is provided on the pressure and suction surfaces 74, 76. During the coating process, the TBC 102 typically penetrates the trailing edge exit 84, which may restrict the area of the uncoated trailing edge exit 84 by up to 75%. However, the TBC 102 within the trailing edge exit 84 does not reach the metering pedestals 91.

The disclosed pedestal configuration increases the velocity of the trailing edge coolant flow while maintain the "meter" upstream of the trailing edge exit features. The elongated pedestals that extend to the very trailing edge 72 allow the coolant to exit the airfoil 66 at a higher velocity that matches closer to the gas path air velocity. Without such features the coolant flow typically exits at a much lower velocity than the gas path air. A smaller mixing loss is provided by the airfoil 66 than prior art arrangements because there is a smaller velocity difference between the coolant air and the gas path air at the trailing edge exit 84. The gas path air effectively has less work to do in bringing the coolant air "up to speed" when the two air streams have very similar velocity speeds and directions and results in smaller mixing losses.

The alternating metering pedestal/elongated pedestal arrangement also allows the metering pedestals 91 to be in a location that is upstream of the exit features of the elongated pedestals 93, which makes trailing edge exit 84 insensitive to the detrimental effects of the TBC 102 in the trailing edge cooling passage 82. This occurs because the gaps 96 have a smaller coolant flow area than the trailing edge exit 84. This allows the coolant flow to all of the blades in the rotor of one stage to have very small variation because the meter is set by cast trailing edge cooling passage 82 features that can be controlled to very tight tolerances.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine comprising:
pressure and suction surfaces provided by pressure and suction walls extending in a radial direction and joined at a leading edge and a trailing edge;
a cooling passage arranged between the pressure and suction walls and extending to the trailing edge;
elongated pedestals arranged in the cooling passage and interconnecting the pressure and suction walls, the elongated pedestals spaced apart from one another in the radial direction and extending from a plane to the trailing edge;
a metering pedestal interconnecting the pressure and suction walls, the metering pedestal including at least a portion arranged between the plane and the trailing edge, the portion provided between adjacent elongated pedestals in the radial direction;

a thermal barrier coating in the trailing edge exit downstream from the metering pedestal without reaching the metering pedestal; and wherein the elongated pedestals are spaced apart from one another between 0.045 inch (1.14 mm) and 0.075 inch (1.91 mm) in the radial direction.

2. An airfoil for a gas turbine engine comprising:

pressure and suction surfaces provided by pressure and suction walls extending in a radial direction and joined at a leading edge and a trailing edge;

a cooling passage arranged between the pressure and suction walls and extending to the trailing edge;

elongated pedestals arranged in the cooling passage and interconnecting the pressure and suction walls, the elongated pedestals spaced apart from one another in the radial direction and extending from a plane to the trailing edge;

a metering pedestal interconnecting the pressure and suction walls, the metering pedestal including at least a portion arranged between the plane and the trailing edge, the portion provided between adjacent elongated pedestals in the radial direction;

a thermal barrier coating in the trailing edge exit downstream from the metering pedestal without reaching the metering pedestal; and wherein a trailing edge exit is provided between the elongated pedestals in the radial direction at the trailing edge, the trailing edge exit having an uncoated width of between 0.030 inch (0.76 mm) and 0.060 inch (1.52 mm).

3. An airfoil for a gas turbine engine comprising:

pressure and suction surfaces provided by pressure and suction walls extending in a radial direction and joined at a leading edge and a trailing edge;

a cooling passage arranged between the pressure and suction walls and extending to the trailing edge;

elongated pedestals arranged in the cooling passage and interconnecting the pressure and suction walls, the elongated pedestals spaced apart from one another in the radial direction and extending from a plane to the trailing edge;

a metering pedestal interconnecting the pressure and suction walls, the metering pedestal including at least a portion arranged between the plane and the trailing edge, the portion provided between adjacent elongated pedestals in the radial direction;

a thermal barrier coating in the trailing edge exit downstream from the metering pedestal without reaching the metering pedestal; and wherein a trailing edge exit is provided between the elongated pedestals in the radial direction at the trailing edge, the trailing edge exit having an uncoated height of between 0.010 inch (0.25 mm) and 0.016 inch (0.41 mm).

* * * * *